United States Patent [19]

Baduel

[11] 4,004,114
[45] Jan. 18, 1977

[54] HORN SWITCH FOR MOTOR VEHICLES STEERING WHEELS

[76] Inventor: Franco Sportoletti Baduel, 20 Lungo Dora Bricca, Pianezza Torinese, Turin, Italy

[22] Filed: Apr. 24, 1975

[21] Appl. No.: 571,387

[30] Foreign Application Priority Data

May 9, 1974 Italy ............... 68455/74

[52] U.S. Cl. ............... 200/61.56
[51] Int. Cl.² ............... H01H 9/00
[58] Field of Search ......... 200/61.54, 61.55, 61.56, 200/61.57, 86 R, 86.5, 242, 165

[56] References Cited

UNITED STATES PATENTS

| 2,237,055 | 4/1941 | Little ............... 200/61.56 |
| 2,716,677 | 8/1955 | Stafford ............... 200/61.54 |
| 2,872,539 | 2/1959 | Berner ............... 200/61.56 |
| 2,894,090 | 7/1959 | Timoff et al. ............... 200/61.54 X |
| 3,086,093 | 4/1963 | Barker ............... 200/86.5 X |

FOREIGN PATENTS OR APPLICATIONS

| 626,049 | 2/1936 | Germany |
| 946,870 | 8/1956 | Germany |

*Primary Examiner*—James R. Scott
*Attorney, Agent, or Firm*—Flynn & Frishauf

[57] ABSTRACT

A horn switch for motor vehicle steering wheels, including a pushbutton facing the driver in an upper spatial zone above the median plane of the steering wheel, wherein the electric supply circuit for the horn is closed by the cooperation of two contact surfaces located in a lower spatial zone below the steering wheel median plane, said contact surfaces being formed on a movable contact operable by the pushbutton in the upper zone and by an opposed fixed non-sliding contact in the lower zone.

10 Claims, 8 Drawing Figures

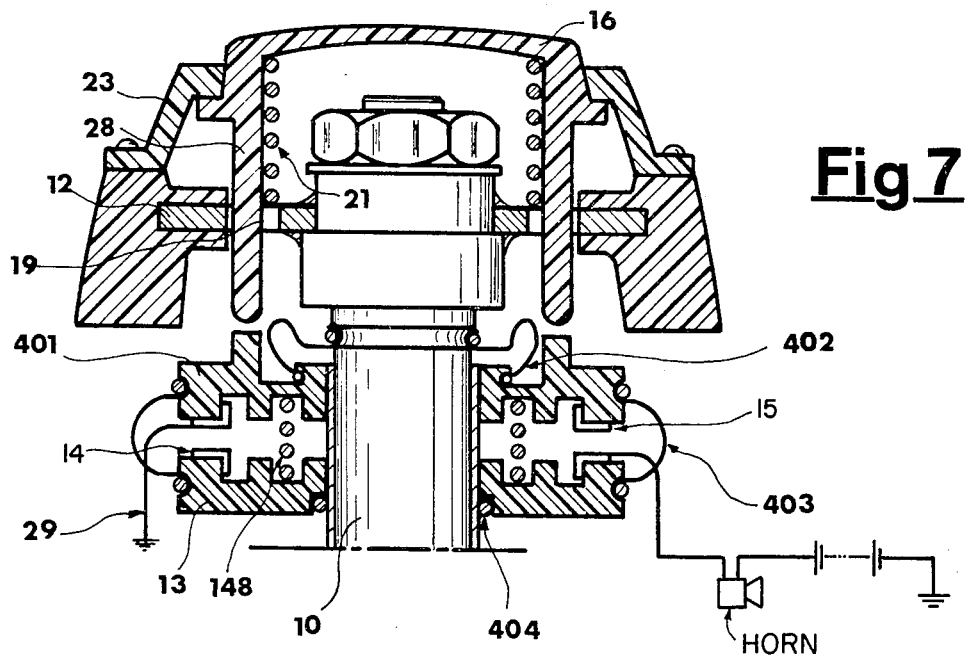
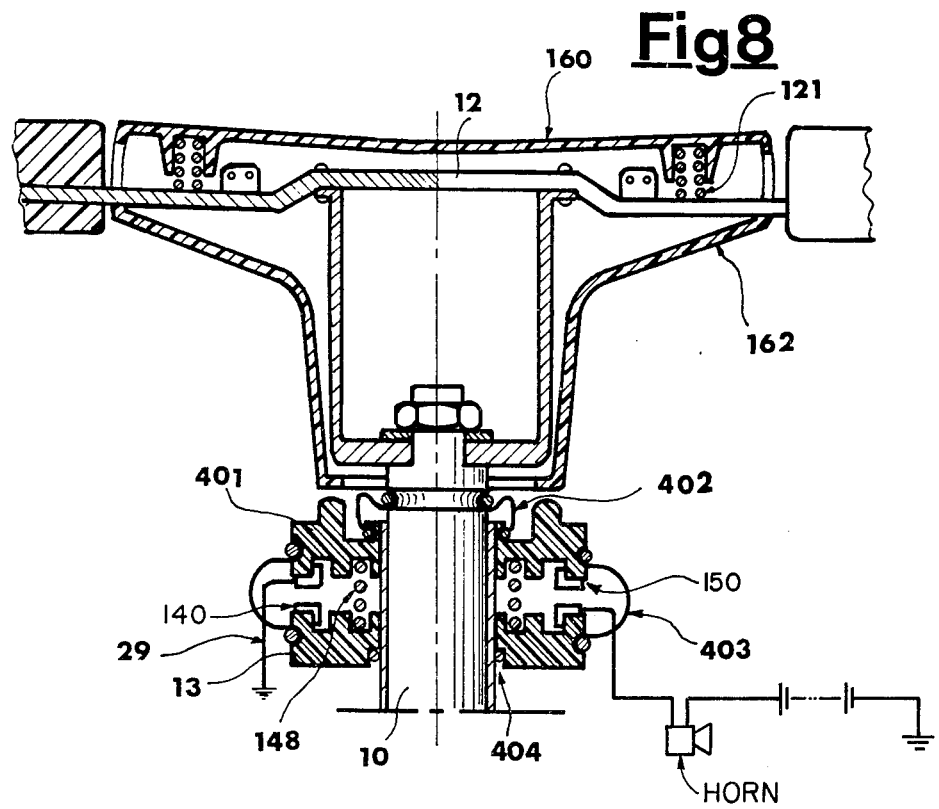

HORN SWITCH FOR MOTOR VEHICLES STEERING WHEELS

BACKGROUND OF THE INVENTION

The present invention relates to a horn switch on a motor vehicle steering wheel, more especially a horn pushbutton which is depressed to close an electric circuit in which the horn is connected.

Prior Art

In conventional switches the making of contacts to complete the horn circuit takes place in the "upper" zone (as hereinafter defined) of the steering wheel assembly and for this purpose the pushbutton is arranged on the frame of the steering wheel to face the driver, and underneath is provided with one or more electric contacts positioned opposite corresponding contacts fixed on the frame, resilient means being located between the frame and the pushbutton to maintain said contacts spaced from one another. The electric circuit is taken to the contacts from the "lower zone" of the steering wheel assembly by suitable connecting devices.

Hereinafter, the space above the median plane of the steering wheel assembly is referred to as the upper zone, i.e., the zone facing the driver, and the term lower zone designates the space below the median plane of the steering wheel assembly. Furthermore, all parts belonging to the steering wheel (in the upper zone as well as in the lower zone) are referred to as "sliding," since they turn with the steering wheel, and all parts not rotating with the steering wheel, since not forming a part of the same (namely, all parts that, in the modern switches, are usually arranged in the lower zone) are referred to as "non-sliding." Finally, the non-sliding contact or contacts are hereafter designated "fixed," while the contact that by its movement effects making of the contacts is termed "movable."

Since the supply voltage usually comes from a fixed terminal in the lower zone (not forming part of the steering wheel, accordingly not sliding therewith), in order to convey current to the pushbutton contacts in the upper zone (belonging to the steering wheel, accordingly sliding therewith) the provision of a suitable connecting device is necessary. A typical device of this kind, answering said purpose, consists in an auxiliary fixed contact, arranged in the lower zone, (forming a part of the steering wheel, accordingly sliding therewith), bearing against the fixed non-sliding supply terminal. Since said auxiliary contact is arranged in the lower zone, it is electrically connected to sliding contacts in the upper spokes zone by means of springs, cables, rivets or the like, with the aid of cable terminals, insulating bushes, screws and the like. All said members, besides complicating the structure of the switch assembly, give rise to current losses as well as to possible faults which may be detrimental to proper operation and safety.

The above described complication of the connecting device is emphasised in those motor vehicle steering wheels in which, whatever may be the reason, the horn pushbutton is in the form of a bar or the like having a wide frontal surface.

According to one known construction of the type aforesaid, the steering wheel is provided with peripheral fixed contacts in the upper zone, contained in insulating bushes engaging opposed seats in the pushbutton. Said seats are each provided with a sliding contact, to which the current is transmitted by means of cables coming from a central socket and crossing the steering wheel frame. The switch is completed by a conventional auxiliary fixed rotating contact, sliding on the fixed non-sliding terminal and arranged in the lower zone, at the lower end of a funnel-shaped protective casing, rigidly connected to the steering wheel spokes.

Object of the Invention

The present invention has for its object the elimination of the inconveniences typical of the abovedescribed controls by simplifying their construction, namely by eliminating the connecting device, and consequently by reducing manufacturing costs and improving both the efficiency and safety of the control.

Brief Summary of the Invention

The present invention provides a control in which the closing of the electric circuit takes place directly in the lower zone, although still utilizing an upper zone pushbutton, the movable contact of which is located in the lower zone, directly opposed to a fixed contact whereby, by pressing the pushbutton, said two contacts will make and close the electric circuit.

Further Features of the Invention

In the case of a pushbutton of the type having a relatively small frontal surface, this may be provided with an extension crossing or spanning the steering wheel frame and carrying at its end below the spokes the movable sliding contact. Alternatively, by appropriately lengthening said contact, it may serve as an extension of the pushbutton. Again, the pushbutton may be depressed on to pairs of non-sliding contacts arranged in the lower zone and resiliently spaced from one another.

In the case that the pushbutton is of the type having a relatively wide frontal surface, the pushbutton may be made integral with the funnel-shaped protective casing in the lower zone, in such a way that the casing can displace vertically relative to the steering wheel frame and together with the pushbutton, the movable contact being fixed on the lower end of said funnel. In such case the funnel, instead of carrying out a contact at its end, can simply press on to pairs of contacts arranged in the lower zone and resiliently spaced from one another.

It is also possible to provide an extension for the pushbutton which spans the steering wheel spokes and directly closes the electric circuit in the lower zone by engagement with the supply terminal in the lower zone.

BRIEF DESCRIPTION OF DRAWINGS

The following is a detailed specification of the invention, with reference to the accompanying drawings as given by way of non-limitative example, in which:

FIGS. 7 and 8 are sectional views of improved pushbuttons according to the invention, showing the movable contact not engaging the pushbutton extension.

DETAILED DESCRIPTION OF ILLUSTRATED EMBODIMENTS

Figure 1:
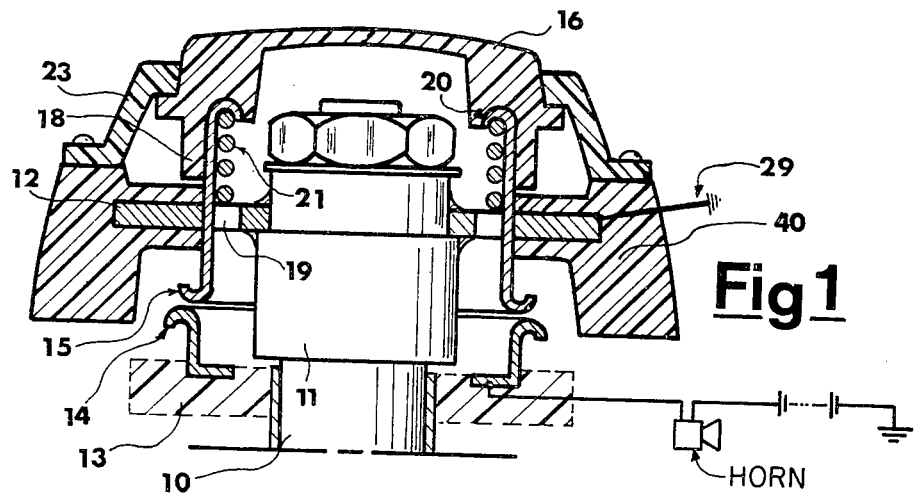
FIG. 1 is a median cross-section of an improved control showing an embodiment of pushbutton having a relatively small frontal surface.
Figure 3:
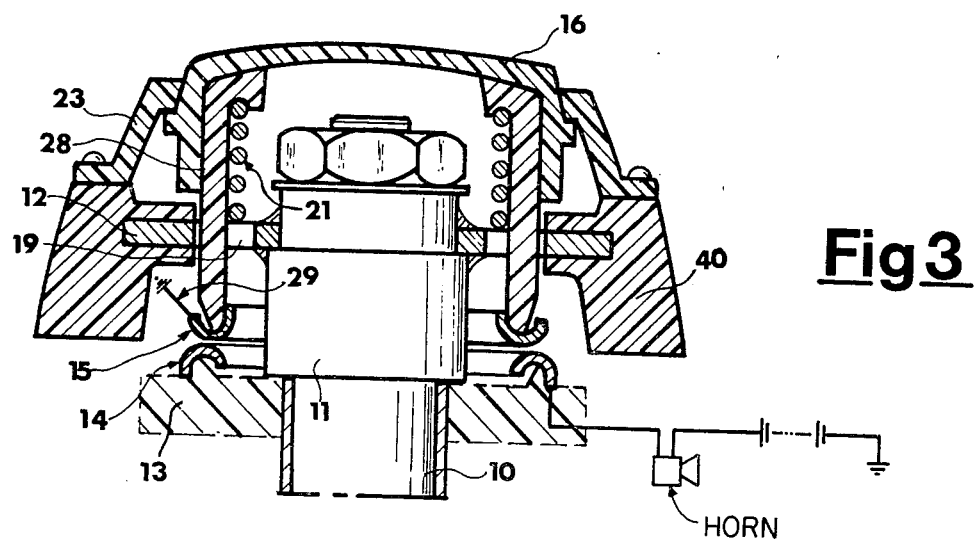
FIG. 3 is a partial section similar to FIG. 1, but showing a constructive variant of the control.
Figure 2:
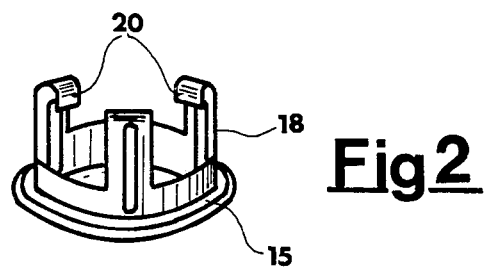
FIG. 2 is a perspective view showing a detail of the construction of FIG. 1.

With reference to FIGS. 1 to 3, the reference 10 shows the steering column, 11 the hub of the steering wheel frame, while 12 shows the spokes which, in the case that a hub is as shown, are rigidly connected to it. On the column 10 a support 13 is provided (for instance the switching-releasing device) carrying the fixed non-sliding supply terminal 14; the terminal as shown in the drawing comprises an element of electrically conductive material, for instance brass and is connected to the horn as shown in FIG. 1.

According to the invention, the movable sliding contact 15 mates directly against the fixed non-sliding supply terminal 14 when pressed on to the pushbutton 16, of which it forms the extreme extension.

For this purpose, the movable sliding contact 15 is located directly opposite to the fixed supply terminal 14 in the lower zone of the steering wheel assembly and structured as a direct extension of the pushbutton 16 crossing the spokes 12 of the steering wheel.

According to the specific embodiment of FIG. 2, as given by way of example, both the pushbutton extension and the movable contact 15 are machined integrally, and comprise a metal upturned tripod and including, besides the contact crown 15, three legs 18 passing through the slits 19 in the spokes 12, terminating at their upper ends in hooks 20, which are secured to the pushbutton 16, finally guiding in turn a counter-spring 21. The latter, by acting on the spokes 12, keeps said tripod against the pushbutton 16 and the latter in a lifted rest position against a ring nut 23, the movable sliding contact 15 thereby being separated from the fixed non-sliding terminal 14. Said ring nut 23 is on its turn either secured on the casing 40 containing the spokes 12 or secured directly on the spokes 12.

Said spring 21, besides acting as a resilient counter element, works as an electrically conducting member between the spokes 12 (as connected to a grounding point 29) and the contacts 15.

According to the variant of FIG. 3, the pushbutton extension, contrary to the example above, is not machined integral with the movable contact, but it comprises vertical rods 28 of non-conducting material passing through the slits 19 of the spokes 12, engaging respectively at their upper ends the pushbutton 16 and the counter spring 21, and at their lower ends in the lower zone the movable contact 15, the latter being opposite the fixed supply terminal 14. The movable sliding contact 15 will advantageously comprise a brass crown showing an L-profile, electrically connected to a ground point, for instance by means of a cable 29. In such a case the spring 21 will exclusively work as a resilient counter element.

Figure 4:
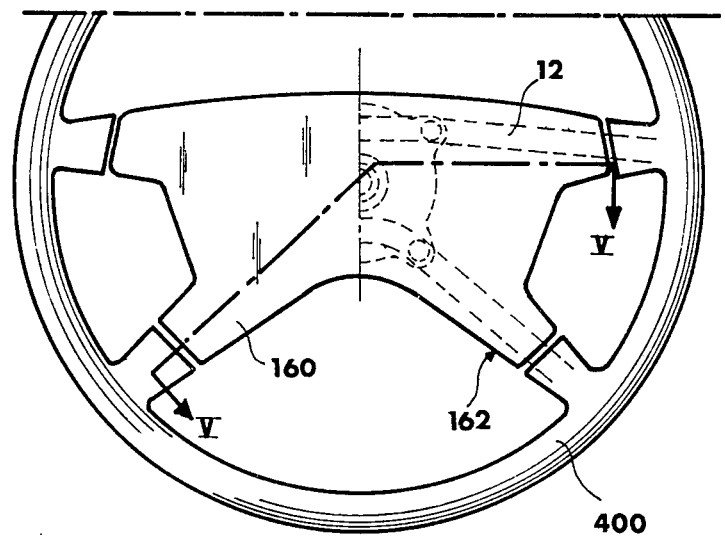
FIG. 4 is a top partly sectional plan of a steering wheel assembly with an improved pushbutton according to the invention, of the type showing a relatively wide frontal surface.
Figure 5:
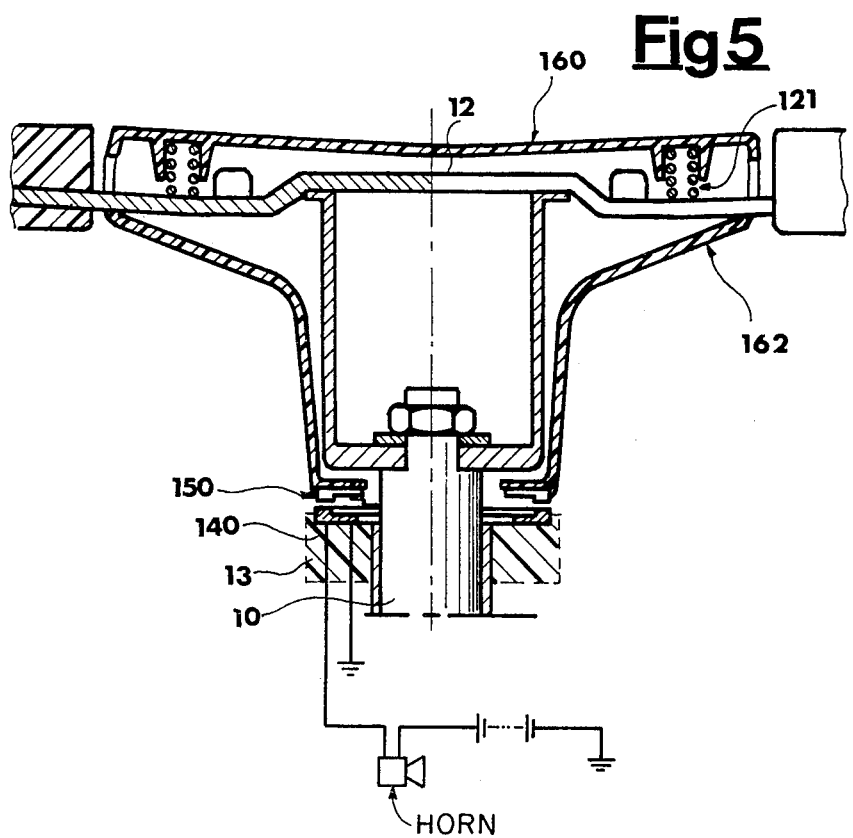
FIG. 5 is a section according to line V—V of FIG. 4.

The embodiment according to FIGS. 4 and 5 concerns a pushbutton 160 of the type having a relatively wide frontal surface extending on to the spokes 12 of the steering wheel 400. In the lower spokes zone is shown a funnel-shaped protective casing 162, concealing both the connection spokes/steering wheel column and a part of the steering wheel spokes. According to the invention, the pushbutton 160 and the funnel 162 are made integral, so that the funnel will move together with the pushbutton each time that the latter is pressed against the action of the counter springs 121 reacting on the spokes 12 of the steering wheel. The lower end of said funnel 162 carries the movable sliding contact 150, which is therefore rigidly connected to the pushbutton 160 and which directly engages the fixed non-sliding supply terminal 140, the contact 150 being bonded by means of a cable 29. In such a way it is possible to carry out once again the basic concept of the invention, namely providing the pushbutton 160 with an extension, for instance of the funnel 162, spanning the spokes, or in a general way, the steering wheel frame, instead of crossing it.

Figure 6:
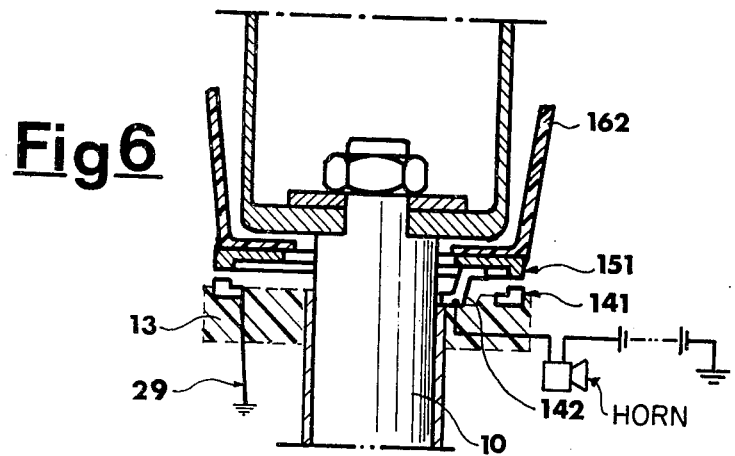
FIG. 6 is a section similar to the preceding one, but showing a further variant of the invention.

The embodiment according to FIG. 6 relates to a pushbutton like the one described above, but in which the movable sliding contact 151 is live; accordingly, the opposed fixed non-sliding contact does not consist in said fixed feeding terminal 142, but in an annular grounding contact 141. On the contrary, the supply terminal 142 comprises a fixed non-rotating plate or the like, resiliently sliding against the movable rotating contact 151, permitting the latter, in consequence of a pressure on the pushbutton 160, to move with the opposed non-sliding grounding contact 141, accordingly closing the electric circuit. It is a matter of course that said inverted arrangement can be employed in the embodiment of FIG. 3.

In the embodiments according to FIGS. 7 and 8 are respectively illustrated a pushbutton of the type having a reduced frontal surface (FIG. 7) and one having a wide frontal surface (FIG. 8). Said embodiments, which are especially fitted to high performance vehicles, are different from those specified above in that the pushbutton 16 or 160, although extending from the lower zone by means of the vertical rods 28 or the funnel 162, do not carry the corresponding movable contact 15 or 150. On the contrary, the latter contact is resiliently arranged as a non-rotating annulus or bunch, directly opposite to the fixed contact 14 or 140 on the support 13; said annulus being made dust-tight by means of bellows 402 or 403 as well as by cooperating packing 404.

It is a matter of course that, taking for granted the principle of the invention, the performance details and the ways of carrying out the invention can widely vary in relation to the above description and accompanying drawings as given by way of non-limitative example, without departing from the scope of the invention.

I claim:

1. A horn switch for a motor vehicle steering wheel for controlling a horn-operating circuit of the vehicle, said steering wheel having a frame including a hub and a rim rigidly interconnected by spokes, said frame having an upper side facing a driver of the vehicle and an underside, said horn switch comprising:
   a horn-operating element;
   means mounting said horn-operating element on the upper side of the steering wheel frame for rotation therewith and depression relative thereto;
   means for upwardly biasing said horn-operating element;
   a pair of opposed normally separated electrical contacts located on the underside of the steering wheel frame, one of said contacts being fixed and the other of said contacts being movable in rotation with the steering wheel frame and axially with said horn-operating element; and connecting leg means extending from the upper side to the lower side of the steering wheel frame to connect said horn-operating element and said other movable contact;

said other movable contact being of annular form centered on the axis of the steering wheel such that depression of said horn-operating element causes said other movable contact to cooperate with said fixed contact to close the horn-operating circuit in any position of rotation of the steering wheel frame.

2. A horn switch according to claim 1, wherein said connecting leg means passes through the hub of the steering wheel frame.

3. A horn switch according to claim 2, wherein said connecting leg means comprises a spider member having a base and a plurality of legs upstanding from the base, the upper ends of said legs being formed with abutments for engaging said horn-operating element, and said upwardly biasing means comprises a spring acting between the steering wheel frame and the underside of said abutments on said legs of said spider member.

4. A horn switch according to claim 3, wherein said spider member is made of electrically conductive material and its base is integrally formed with said other movable contact, said spider member being connected to ground, and means is provided for connecting said fixed contact through said horn-operating circuit and the battery of the vehicle to ground.

5. A horn switch according to claim 3, wherein said spider member is made of electrically insulating material and its base is fixedly assembled with said other movable contact, whereby said spider member acts to insulate the steering wheel frame from the horn-operating circuit.

6. A horn switch for a motor vehicle steering wheel for controlling a horn-operating circuit of the vehicle, said steering wheel having a frame including a hub and a rim rigidly interconnected by spokes, said frame having an upper side facing a driver of the vehicle and an underside, said horn switch comprising:

a horn-operating bar spanning the hub of the steering wheel frame;

means mounting said horn-operating bar on the upper side of the steering wheel frame for rotation therewith and depression relative thereto;

means for upwardly biasing said horn-operating bar;

a pair of opposed normally separated electrical contacts located on the underside of the steering wheel frame, one of said contacts being fixed and the other of said contacts being movable in rotation with the steering wheel frame and axially with the horn-operating bar; and funnel means extending from the upper side to the lower side of the steering wheel frame outside the hub to connect said horn-operating bar and the other of said contacts;

said other movable contact being of annular form centered on the axis of the steering wheel such that depression of said horn-operating bar causes said other movable contact to cooperate with said fixed contact to close the horn-operating circuit in any position of rotation of the steering wheel frame.

7. A horn switch according to claim 6, wherein said funnel means comprises a protective funnel of insulating material, the upper end of said funnel being connected to said horn-operating bar and said funnel tapering inwardly towards its lower end, said funnel having slots therein to pass the spokes of the steering wheel frame, directly carrying said other movable contact at said lower end.

8. A horn switch according to claim 7, having two fixed contacts, the first fixed contact being a rigid contact connected through the horn to the live battery terminal of the vehicle and the second fixed contact being a grounded resilient contact permanently engaged by said other movable contact and yielding when said horn-operating bar is depressed to permit engagement of said other movable contact with said first fixed contact.

9. A horn switch for a motor vehicle steering wheel for controlling a horn-operating circuit of the vehicle, said steering wheel having a frame including a hub and a rim rigidly interconnected by spokes, said frame having an upper side facing a driver of the vehicle and an underside, said horn switch comprising:

a horn-operating element;

means mounting said horn-operating element on the upper side of the steering wheel frame for rotation therewith and depression relative thereto;

means for upwardly biasing said horn-operating element;

a pair of opposed normally separated electrical contacts located on the underside of the steering wheel frame, one of said contacts being fixed;

extension means connected to said horn-operating element to extend from the upper side to the lower side of the steering wheel frame;

a non-rotatable depressable supporting member beneath the steering wheel frame for the other of said contacts;

said extension means being rotatable with the steering wheel frame relative to said supporting member and engaging therewith to depress said other contact when said horn-operating element is depressed; and at least one of said extension means and said other contact being of annular form centered on the axis of the steering wheel such that depression of said horn-operating element will cause said other contact to cooperate with said fixed contact to close the horn-operating circuit in any position of rotation of the steering wheel frame.

10. A horn switch according to claim 9, including a flexible envelope enclosing the space between said other contact and said fixed contact.

* * * * *